US007445217B1

(12) United States Patent
Price

(10) Patent No.: US 7,445,217 B1
(45) Date of Patent: Nov. 4, 2008

(54) WALK AID

(76) Inventor: Donald J Price, 904 E. Water St., Prospect, OH (US) 43342

( * ) Notice: Subject to any disclaimer, the term of this patent is extended or adjusted under 35 U.S.C. 154(b) by 0 days.

(21) Appl. No.: 11/880,039

(22) Filed: Jul. 19, 2007

(51) Int. Cl.
*B62B 9/00* (2006.01)

(52) U.S. Cl. .................................... 280/87.021; 135/67

(58) Field of Classification Search .................. 280/5.2, 280/5.3, 87.021, 87.051, 87.041; 135/67, 135/84, 65
See application file for complete search history.

(56) References Cited

U.S. PATENT DOCUMENTS

| | | | | |
|---|---|---|---|---|
| 2,941,846 | A * | 6/1960 | Hall et al. | 305/1 |
| 3,411,599 | A * | 11/1968 | Kahlmorgan et al. | 180/8.2 |
| 3,499,501 | A * | 3/1970 | Bauer et al. | 180/8.2 |
| 3,872,945 | A * | 3/1975 | Hickman et al. | 180/65.6 |
| 4,200,161 | A * | 4/1980 | Penington, Jr. | 180/8.2 |
| 4,251,105 | A * | 2/1981 | Barker | 297/6 |
| 4,280,578 | A * | 7/1981 | Perkins | 180/6.5 |
| 4,387,891 | A * | 6/1983 | Knochel | 482/68 |
| 4,768,536 | A * | 9/1988 | Hawkins | 135/67 |
| 4,802,542 | A * | 2/1989 | Houston et al. | 180/65.5 |
| 5,137,102 | A * | 8/1992 | Houston et al. | 180/65.5 |
| 5,168,947 | A * | 12/1992 | Rodenborn | 180/19.1 |
| 5,636,651 | A * | 6/1997 | Einbinder | 135/67 |
| 5,794,639 | A * | 8/1998 | Einbinder | 135/67 |
| 6,378,883 | B1 * | 4/2002 | Epstein | 280/250.1 |
| 6,402,161 | B1 * | 6/2002 | Baghdadi | 280/5.2 |
| 6,609,719 | B2 * | 8/2003 | Heien | 280/5.26 |
| 7,017,687 | B1 * | 3/2006 | Jacobsen et al. | 180/8.3 |

* cited by examiner

*Primary Examiner*—Jeffrey J Restifo
(74) *Attorney, Agent, or Firm*—James R. Eley; Michael A. Forhan; Eley Law Firm Co.

(57) ABSTRACT

A walk aiding apparatus. An electric gear motor is attachable to a frame of a wheeled walker device and includes a first sprocket rotatably coupled to the gear motor. A rotatable cam shaft is stabilized by a pair of bearings, the cam shaft having a second sprocket coupled thereto. A set of cams are adjustably mounted to the cam shaft. A belt extends between the first and second sprockets. A battery is selectably coupled to the electric gear motor through an electrical switch, the electric gear motor being energized when the electrical switch is actuated. The electric gear motor, when energized, rotates the cam shaft and, in turn, the cams, such that the cams periodically contact a surface to effect movement of the wheels of the walker device with respect to the surface.

6 Claims, 3 Drawing Sheets

WALK AID

FIELD OF THE INVENTION

The present invention relates to a walk aid apparatus for improving the movement of any framed structure that can be used in assisting someone to go forward or backward a predetermined amount by depressing a switch or control which is the first action that initiates the process to engage the cam with the ground or floor surface and pick up the front of the walker or other device and cause it to take a controlled step. More specifically this walk aid could be attached and used in conjunction with any rehabilitative equipment such as walkers that assist a person in walking to enhance the person's ability to step forward or in reverse and control the length of the stride based on a person's particular physiological requirements. This aid could be useful to people who have had strokes and who suffer from other illnesses and or injuries and can still walk under their own power. One very important use could be as part of the rehabilitative program for our soldiers returning from war with injuries who just need a little assistance getting around but wish to remain as independent as possible in their lifestyle.

BACKGROUND OF THE INVENTION

1. Technical Field

The present invention relates to a walk aid apparatus that may be used on walker devices or other assistive or rehabilitative equipment for assisting the elderly, partially handicapped, victims of stroke, with limited movement from being injured, or any other persons needing assistance walking that need to move about in an upright position. More particularly, the present invention relates to a walking aid that could combine a walker, framed bars, and adaptable controls and devices for different degrees of user coordination based on a person's own step patterns.

2. Description of the Prior Art

Wheelchairs and walkers of various types and designs have been used for a considerable period of time for the purpose of assisting partially disabled individuals or injured persons to remain mobile on their own without support. Wheelchair designs have become quite sophisticated as a result of efforts intended to enable individuals to have a degree of control over their own movements. A major disadvantage of wheelchairs and other related devices in general is that such devices, while assisting disabled or injured individuals in moving about an area, restrict individuals to a relatively rigid sitting position within the chair that causes continual pressure and contact on the same areas of the body, and may lead to such complications as skin and tissue degeneration.

Additionally, wheelchairs and other mobility devices afford the individual little opportunity for realistic physical activities. For example, children who have difficulty walking are generally put in a wheelchair when they become too heavy to carry, and they become too old for their crawling to be socially acceptable. Another example is when someone elderly starts to show signs of having problems with mobility they often must resign themselves to relying on a wheelchair and limited movement of their limbs in order to feel safe in their environments. This attitude overlooks the fact that the human body is a machine designed to move, not simply sit. Such lack of motion has a negative impact on total functioning and development of the child's body, mental outlook, and social development.

Walker devices were designed to overcome some of the aforementioned problems associated with wheelchairs. It is known that devices that enable a partially disabled individual to remain in a standing position for relatively long periods of time, e.g. two or more hours at a time, provide substantial advantages and benefits to the disabled individual that is forced to remain seated in a wheelchair or other device. More particularly, passive standing produces beneficial physiological effects that include the reduction of bone and calcium loss, reduction of hypercalciuria and urinary calculi, increased muscular tone and maintenance of range of motion, improved orthostatic circulatory regulation, and increased bladder pressure.

Additionally, substantial psychological benefits results from permitting partially physically disabled or restricted, elderly or severely injured individuals to remain in a standing position. Such standing positions provide increased independence and morale as well as permit the person to continue to function in life under their own power. As a result, walker devices of various types have been developed to permit the partially disabled individual to remain in the standing position for a period of at least several hours and remain mobile.

A problem is often encountered when a disabled individual makes the transition from the use of parallel bars in physical therapy to the use of a walker. Parallel bars provide secure and immovable support for the individual, whereas a walker is made for movement. As a partial solution, an individual in physical therapy may be able to walk using parallel bars, or anywhere else where a handrail is available. It is sometimes the case that a disabled elderly or injured person's install hand rails throughout their residence to provide mobility in that environment. The drawback with handrails is that they only are available in fixed locations. Thus, while handrails are a solution, few individuals could accept or afford placing handrails everywhere. An integrated walker allows for mobility anywhere that a person walking normally goes under their own power.

It is not unusual that countless attempts are made to progress a partially disabled or injured person from parallel bars to a standard walker. However, these efforts often fail because the walker is not designed to go at the pace of the individual. The problem is not the person or the walker; it is the mismatch between them and the stride that each person's body naturally accommodates.

SUMMARY OF THE INVENTION

The invention is designed for those individuals who just need assistance in controlling the speed of walking under their own power with a support or device of some type. The inventor himself has limited movement and use of his legs due to a bout with diabetes and several heart related matters such as stroke, and has made the invention herein based on the user's perspective. The invention allows a user to engage in rehabilitative and therapeutic exercises, while performing the activities of normal living. While other walkers are known, none specifically address the needs, coordination patterns, and mobility needs of each individual and allow them to control the step to match their natural stride at that particular point in their recovery. The speed at which the device moves is user controlled and thereby compatible with any framed walker or other device in use today. The apparatus could and may be attached to any walker or other walk aiding device that is comprised of a framed structure and allows for the attachment to said front cross-member. This means any existing walker or similar walking aid could be outfitted with the attachments which would save the consumer from purchasing a new walker or aid just to gain the benefit as well as the apparatus could become a integral part in the future manufacturing of walking assisted devices.

DETAILED DESCRIPTION OF THE INVENTION

The invention provides a apparatus that integrates with a walker or other assisted device associated with walking to assist disabled individuals, e.g. those with such debilitating illnesses as stroke, to move about in an upright position and to walk or take a controlled step. The invention provides a cost effective tool that allows many individuals having physical limitations to learn or regain their ability to walk and to remain more independent and active in their lifestyles. The invention was made with the view that the only true disability of people with these types of health related problems is not having the proper tools to meet the partially disabled individual's requirements and coordination patterns. The invention provides a tool to fulfill and augment that need.

The user controls movement of the walker or walk aid device by depressing a switch. The speed and distance at which the device takes a step is adjustable by means of how much you press the switch that eventually engages the cam.

Figure 1:
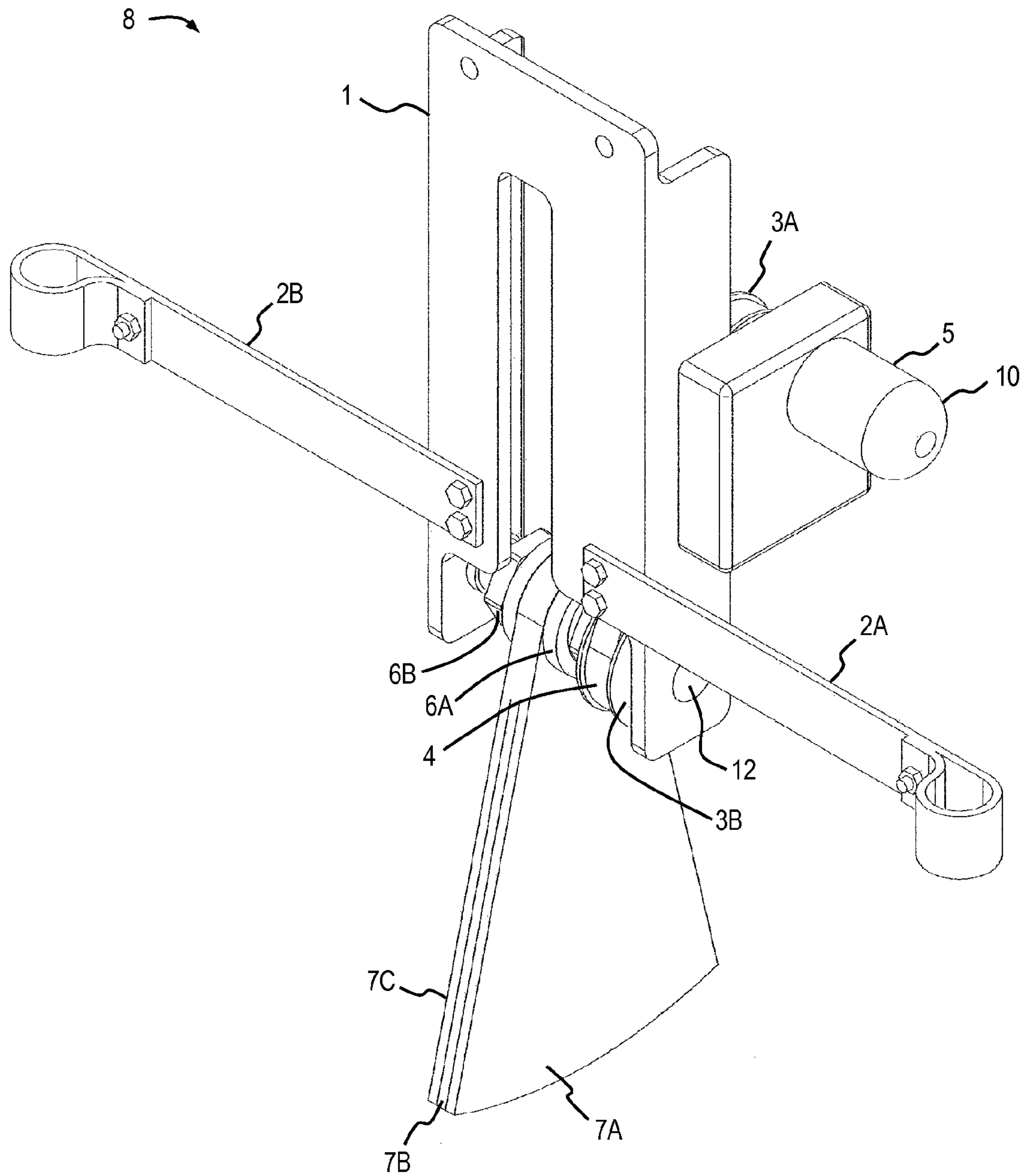
FIG. 1 is a perspective front view of the walk aid.

FIG. 1 is a perspective front view of the walk aid in accordance with the present invention. This drawing is included to better visualize the overall attachment of the device braces to the said walker being used. This also provides more for how the cosmetics effect's the said walker or other mobility device that supports a frame.

Figure 2:
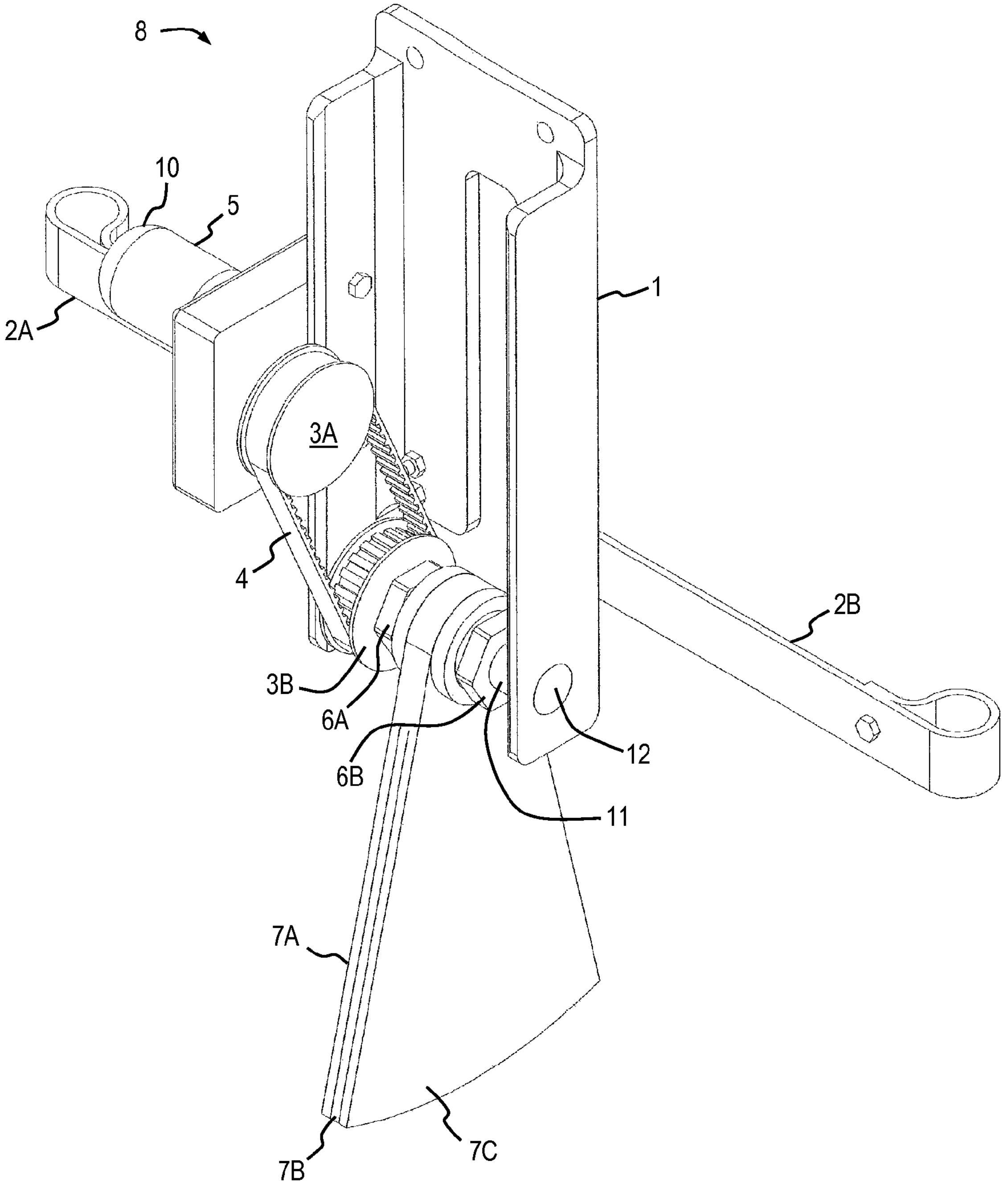
FIG. 2 is a perspective rear view of the walk aid.

FIG. 2 is a perspective rear view of the walk aid in accordance with the present invention. This device includes a machined bracket identified by number (1) with a slot that provides for clearance of the cams to rotate without resistance and cause movement of the said walker or framed device. The said bracket can fit any size walker or mobility device that supports the use of a frame. The one stipulation is that the braces must be attached to the front two legs. The device requires two or more braces as in the front view and rear view numbers 2A-2B to support the thrust from the cam as it rotates. If you will notice the ends of the braces are curved so they can be wrapped around the leg supports and tightened with bolts and nuts. The device is driven by 12-volt dc gear reduction motor that is labeled as number (5) in the diagram. It is secured to the machined bracket by two bolts. Two, two inch sprockets (3A-3B) on the end of said motor drives the camshaft. The serrated belt (number 4) matches with the teeth on the sprocket to cause resistance, which turns the sprocket that rotates the camshaft. The fluid movement of the camshaft is controlled through the use of bearings on each end of the shaft, in conjunction with two flanged lock nuts (numbers 6A-6B) that keep the cams in place. The cams are adjustable for a short or longer stride by adjusting the flanged lock nuts. The three cams that control the length of the step are identified as number 7A-7B-7C.

Figure 3:
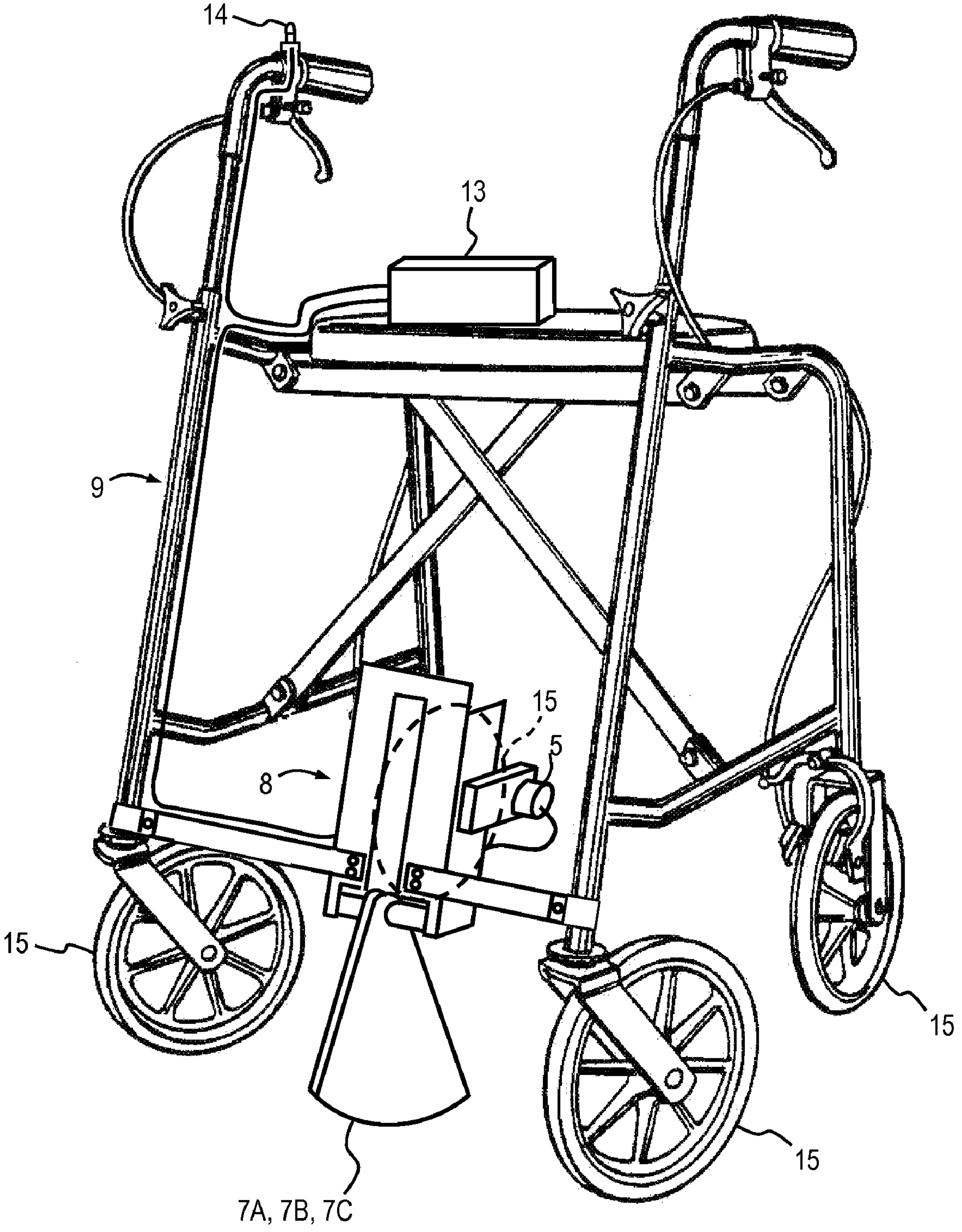
FIG. 3 shows the walk aid mounted to a walker device.

FIG. 3 shows a walk aid 8 mounted to a wheeled walker device 9 according to an embodiment of the present invention. With reference now to FIGS. 1-3 together, electric gear motor 5 (optionally having a brake 10) is attached to bracket 1. First sprocket 3A is rotatably coupled to gear motor 5 and is driven thereby. A rotatable cam shaft 11 is rotatably mounted to bracket 1 and is stabilized by a pair of ball bearings 12 at opposing ends of the shaft, the cam shaft also having a second sprocket 3B coupled thereto. A set of cams 7A, 7B and 7C are mounted to cam shaft 11, the cams being adjustably arranged between a pair of lock nuts 6A, 6B and secured thereby. A belt 4 extends between the first and second sprockets 3A, 3B. A battery 13 is selectably coupled to electric gear motor 5 through an electrical switch 14, the electric gear motor being energized when the electrical switch is actuated.

In operation, when the electric gear motor 5 is energized by battery 13 through switch 14, sprockets 3A, 3B, driven by the gear motor and coupled together by belt 4, rotate cam shaft 11 and, in turn, cams 7A, 7B and 7C. Cams 7A, 7B and 7C periodically and rotatably contact a surface, such as the ground or a floor, thereby lifting the front of walker device 9 and causing it to take a step to effect movement of wheels 15 of the walker device with respect to the surface. For example, on an uneven surface walk aid 8 may take a step forward for the user of walker device 9, thereby affording the user access to uneven and graded areas. Movement of walk aid 8 is controlled by a user at a desired pace by operating switch 14, the speed and distance covered by the walk aid being proportionate with the actuation of the switch. Walk aid 8 may be configured for both forward and reverse operation.

The invention is claimed as follows:

1. A walk aiding apparatus, comprising:

an electric gear motor attachable to a frame of a four-wheeled walker device;

a first sprocket rotatably coupled to the gear motor and driven thereby;

a rotatable cam shaft stabilized by a pair of bearings, the cam shaft having a second sprocket coupled thereto;

a plurality of cams mounted to the cam shaft, the cams being adjustably arranged between a pair of nuts and secured thereby;

a belt extending between the first and second sprockets; and a battery selectably coupled to the electric gear motor through an electrical switch, the electric gear motor being energized when the electrical switch is actuated, wherein the electric gear motor, when energized, rotates the cam shaft and, in turn, the cams, such that the cams periodically contact a surface to effect movement of the wheels of the walker device with respect to the surface.

2. The walk aiding apparatus of claim 1, wherein said electrical switch is configured for selectably controlling forward and reverse rotation of the sprockets by the electric gear motor, thereby effecting forward and reverse rotation of the cams.

3. The walk aiding apparatus of claim 2, wherein said battery is a 12 volt battery.

4. The walk aiding apparatus of claim 1, wherein the electric gear motor further includes a brake.

5. The walk aiding apparatus of claim 1, further comprising a battery charger to recharge the battery.

6. The walk aiding apparatus of claim 1 wherein the apparatus further includes a bracket that is secured to the wheeled walker device with a plurality of braces to secure the apparatus to the wheeled walker device.

* * * * *